United States Patent [19]

Modisette

[11] 4,286,347
[45] Sep. 1, 1981

[54] DOUBLE ACTING TURBINE FOR CONVERTING WAVE ENERGY OF WATER TO ELECTRICAL POWER

[75] Inventor: Jerry L. Modisette, Nassau Bay, Tex.
[73] Assignee: Tideland Signal Corporation, Houston, Tex.
[21] Appl. No.: 490,567
[22] Filed: Jul. 22, 1974
[51] Int. Cl.³ .............................................. B63B 21/52
[52] U.S. Cl. ............................... 9/8 R; 290/42; 290/53
[58] Field of Search ........................ 290/52, 53, 54, 55, 290/42, 43, 44; 9/8 R

[56] References Cited

U.S. PATENT DOCUMENTS

| | | | |
|---|---|---|---|
| 1,448,029 | 3/1923 | Larry et al. | 290/53 |
| 3,064,137 | 11/1962 | Corbett et al. | 290/54 |
| 3,200,255 | 8/1965 | Masuda | 290/53 |
| 3,912,938 | 10/1975 | Filipenco | 290/53 |

FOREIGN PATENT DOCUMENTS 745084 2/1956 United Kingdom ...................... 290/53

Primary Examiner—Trygve M. Blix
Assistant Examiner—Jesús D. Sotelo
Attorney, Agent, or Firm—Bard & Groves

[57] ABSTRACT

A double acting turbine for converting water wave energy to electrical power in a marine buoy or platform. A tubular body is provided one end of which is adapted to be inserted into the water wave and the second end is adapted to extend out of the water whereby the rise and fall of water in the body creates a flow of air in alternate directions through the body. A turbine having a plurality of outwardly extending blades is positioned in the body above the water level and exposed to and rotated by the flow of air and is connected to an electrical generator for generating electricity in response to the rotation of the wheel. The turbine is designed to operate with air flowing in either direction through the turbine so that power is generated as the water both rises and falls in the tubular body. The turbine blades include a concave surface on one side and a convex surface on the opposite side. The cross-sectional shape of the blades are shaped to provide an air flow passageway between adjacent blades which decreases in area from each edge thereby forming a restriction in the passageway between the blade edges whereby the wheel will rotate in a single direction regardless of the direction of flow of air through the body. A stator may be provided on each side of the turbine wheel having a plurality of blades directed towards the concave surfaces of the blades of the turbine wheel. In order to increase the amount of air flow through the body, the body may include a plurality of housings.

21 Claims, 4 Drawing Figures

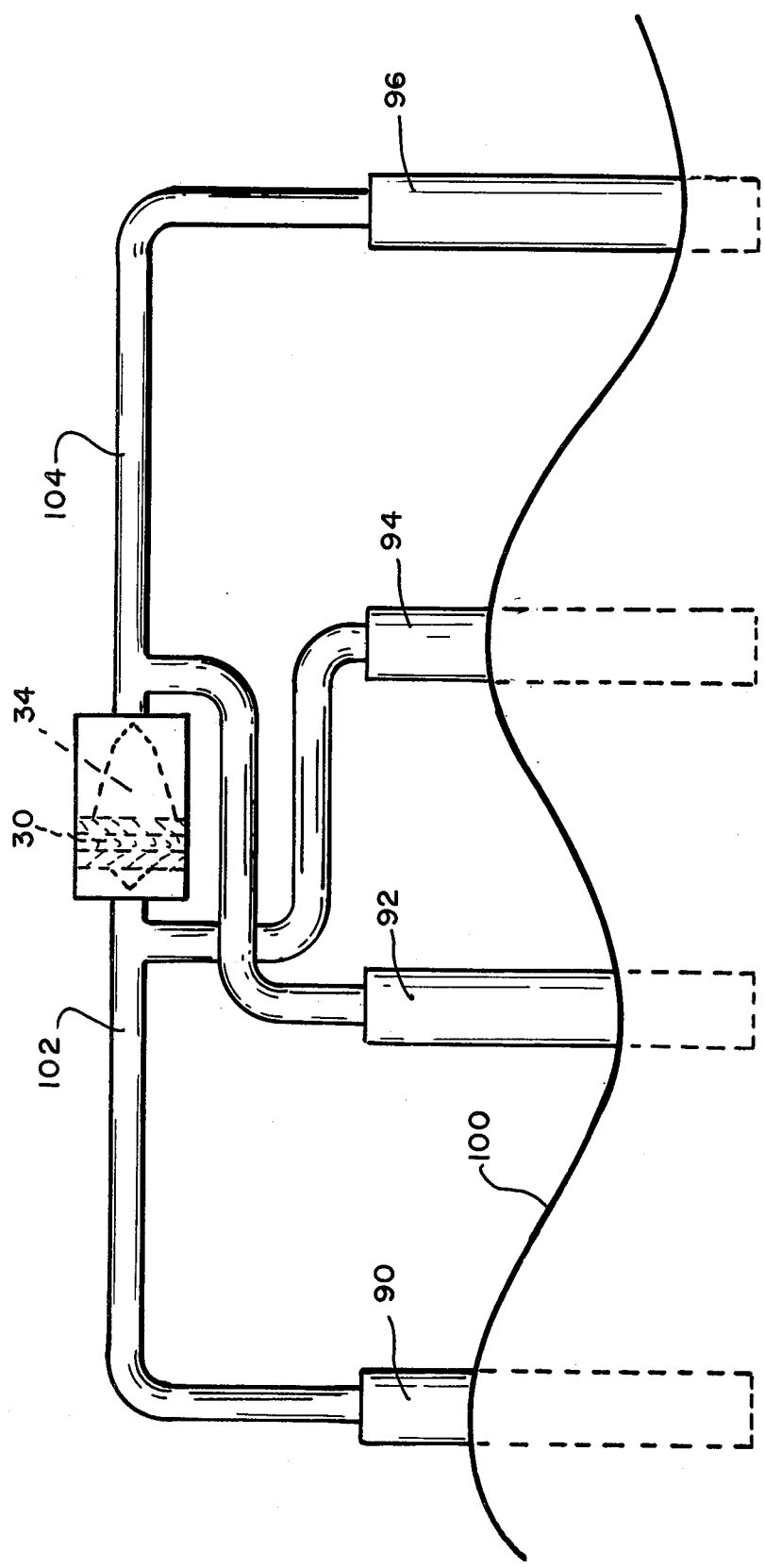

DOUBLE ACTING TURBINE FOR CONVERTING WAVE ENERGY OF WATER TO ELECTRICAL POWER

BACKGROUND OF THE INVENTION

It has long been recognized that the water waves provide a valuable non-polluting energy source. And in particular, the advantages of utilizing the wave energy in remote locations such as buoys and offshore structures have been proposed in U.S. Pat. Nos. 3,064,137 and 3,200,255. However, the prior art devices have been relatively inefficient, have had a low power output, and have been relatively complex.

The present invention is directed to an improved apparatus for converting wave energy to electrical power by providing a double acting turbine driving a generator to produce electrical power. The turbine will rotate in a single direction regardless of the direction of flow of air through the body and generates power both as the water rises and falls in the tube.

SUMMARY

The present invention is directed to a double acting turbine for converting the wave energy of water into electrical power in either a floating or a fixed installation. A tubular body is provided one end of which is adapted to be inserted into the water waves and the second end adapted to extend out of the water whereby the vertical rise and fall of water in the tubular body creates a flow in air in alternate directions through the body. A turbine wheel having a plurality of outwardly extending blades is positioned in the body above the water level and exposed to and rotated by the flow of air and in turn drives a generator for producing electrical power. The turbine is double acting, that is, it rotates in a single direction, but is rotated in response to the air flowing in either direction through the body so that power is generated as the water both rises and falls in the tube. The ability of the turbine to be double acting and thus utilize and create power both on rising and falling of the water is provided in which the cross-sectional shape of the blades is shaped to provide an air flow passageway between adjacent blades which decreases in area from each edge thereby forming a restriction in the passageway between the blade edges thereby speeding up the air flow and changing its direction and creating a centrifugal action of the air passing through the turbine blades wich acts on the blades to rotate the turbine.

Yet a still further object of the present invention is the provision of a double acting turbine generator for converting wave energy into electrical power in which a concave surface is provided on one side of the turbine blades and a convex surface is provided on the opposite side of the turbine blades.

Yet a still further object of the present invention is the provision of a stator on each side of the turbine wheel, each stator having a plurality of blades directed towards the concave surfaces of the blades of the turbine wheel.

Yet a still further object of the present invention is the provision of an air flow passageway between adjacent blades which decreases in area from each edge thereby forming a restriction in the passageway between the blade edges thereby slowing down the air flow after it has passed the restriction so that the air leaves the turbine rotor at low velocity thereby decreasing the pressure loss of the air as it flows through the turbine thereby increasing the efficiency of the turbine.

Still a further object of the present invention is the provision of a tubular body which includes a plurality of housings, one end of each of which is adapted to be inserted into the water waves and the second end of each of said housing is adapted to extend out of the water. The second ends are connected together to a common conduit whereby the plurality of housings provide an increase in air flow for increasing the electrical output through the turbine wheel which is positioned in communication with the common conduit.

Still a further object of the present invention is the provision of a tubular body which includes at least two housings with the housings horizontally spaced apart a distance approximately equal to a half of the length of a normal wave. The second end of one of the housings connected to one side of the turbine and the second end of the other of the housings connected to the second side of the turbine whereby the two housings act in synchronism during normal wave condition for alternating air in both directions through the turbine.

Other and further features and advantages will be readily apparent from the following description of the present invention.

BRIEF DESCRIPTION OF THE DRAWINGS

FIG. 4 is an elevational view of a further modification of the present invention.

DESCRIPTION OF THE PREFERRED EMBODIMENT

Figure 1:
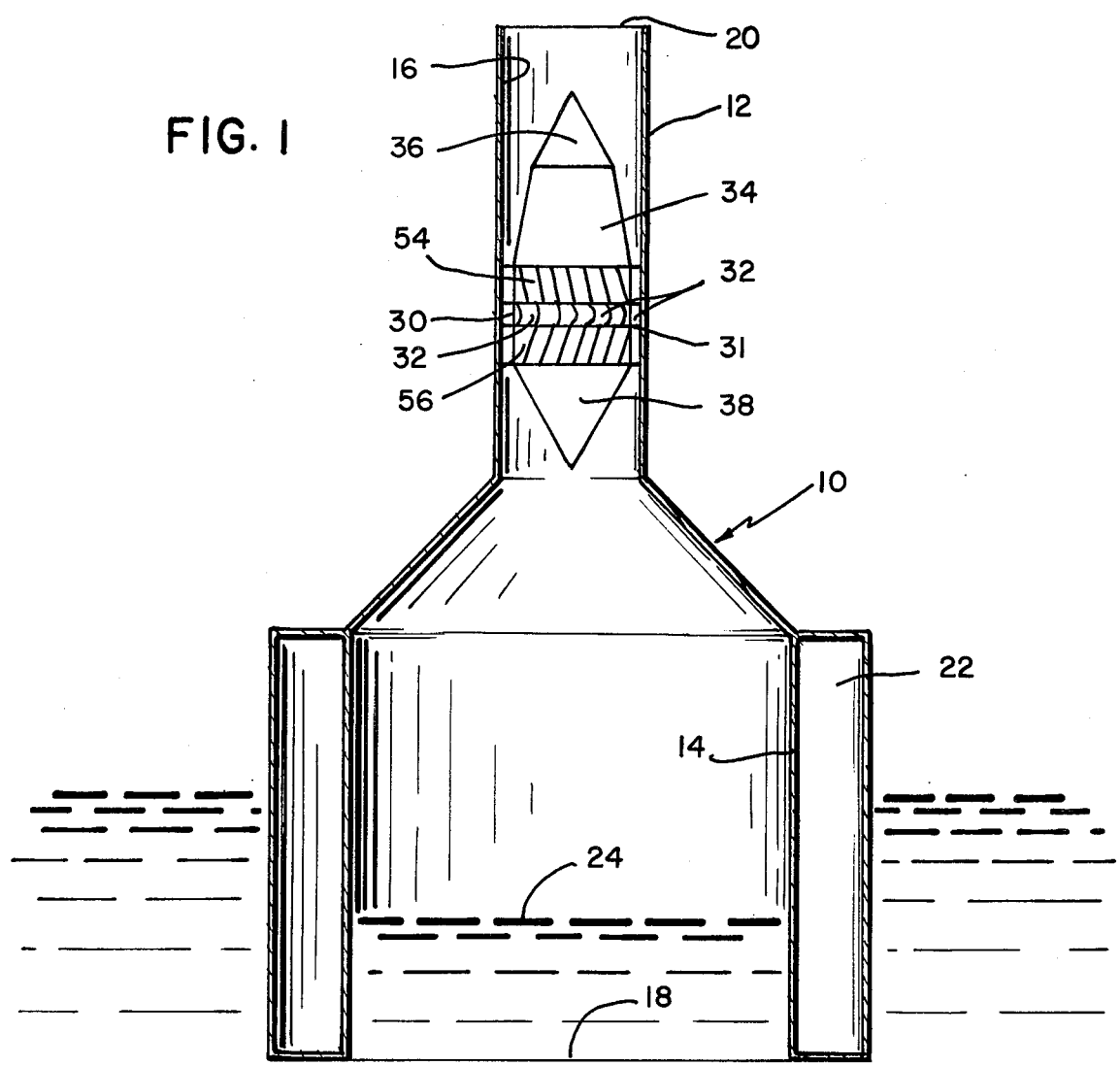
FIG. 1 is an elevational view illustrating the present invention as used on a floating buoy.

Referring now to the drawings, and particularly to FIG. 1, the apparatus of the present invention is generally indicated by the reference numeral 10 which may be either a floating or a fixed structure and generally includes a tubular body generally indicated by the reference numeral 12 which may include a first enlarged portion 14 and a second smaller cross-sectional portion 16. One end of the tubular body 12 such as 18 is adapted to be inserted into the water and the second end 20 is adapted to extend out of the water. If the apparatus 10 is a floating buoy, a suitable buoyancy chamber 22 is provided and the apparatus 10 would be connected to an anchoring cable (not shown).

The water waves cause a rise and fall of the water level 24 inside of the tubular body 12 which alternately creates an air flow upwardly and downwardly through the section 16 of the tubular body 12. The section 14 is enlarged compared to the section 16 in order to create a greater volume of air flow in the section 16.

A turbine wheel 30 having a plurality of outwardly extending blades 32 extending from a hub 31 is positioned in the section 16 of the tubular body 12 above the water level and exposed to and rotated by the flow of air to the tubular body 12. A conventional electrical generator 34 is connected to the turbine 30 to produce electrical power which may either be used directly or for charging storage batteries. Upper and lower flow control cones 36 and 38 are provided for directing the flow of air through the rotor 30 through a restricted passageway for speeding up the air flow.

The above description of a turbine-generator is generally old. However, none of the prior art devices utilizes a double acting turbine wheel which can rotate in the same direction while utilizing the air flowing in either direction through the tubular body 12. The present turbine wheel is designed to provide an inexpensive and trouble-free structure without requiring the complicated mechanical structure of the prior art devices.

Figure 2:
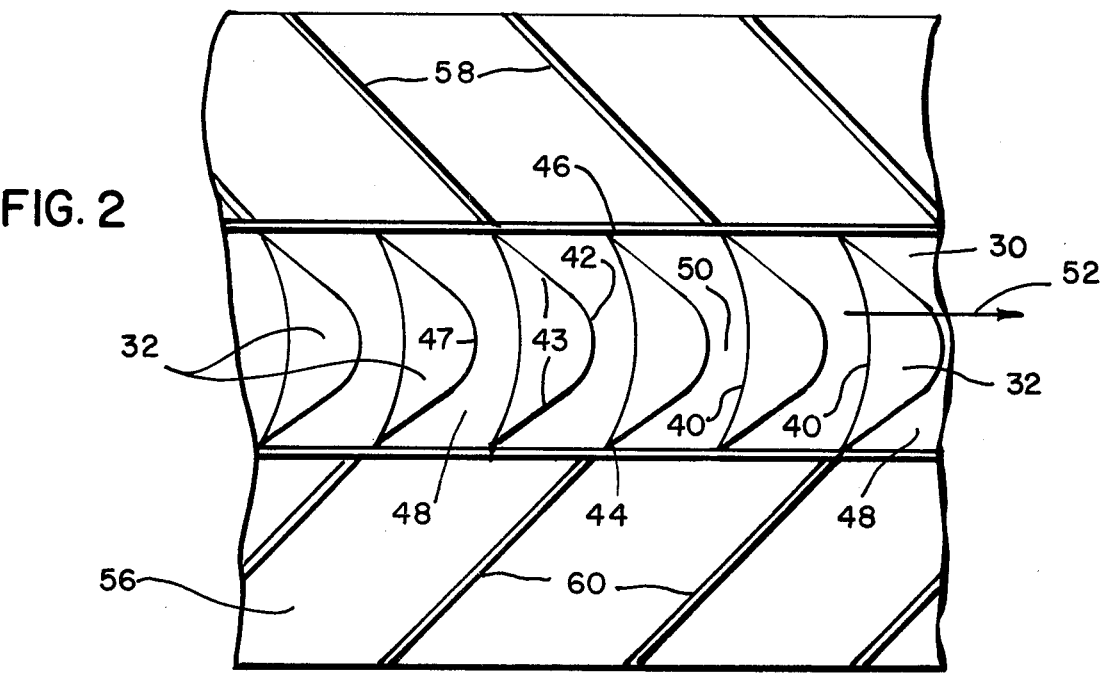
FIG. 2 is an enlarged fragmentary cross-sectional view showing the stators and rotor of the present invention.

The turbine 30 of the present invention includes a circular hub 31 on which is mounted a plurality of outwardly extending blades 32. Preferably, each of the blades 32 includes a concave surface 40 on one side of each of the blades 32 and a convex surface 42 on the second side of the blades 32. Additionally, the cross-sectional shape of the blades 32 increases from the edges 44 and 46 to a maximum, preferably in the center of the blades, thereby providing a flow passageway 48 between each of the blades 32 which decreases in size from each blade edge 44 and 46 to form a restriction 50 between adjacent blades 32. Therefore, when the air passes through the turbine blades 32 from either direction, the low pressure air will enter the passageways 48 and will accelerate as it reaches the restriction 50 and will contact the concave surfaces 40 and change direction and by centrifugal force will cause the turbine 30 to rotate in the direction of the arrow 52. It is further noted that the air passageway 48 is enlarged on each side of the restriction 50 whereby the low velocity air will enter the passageway 48 on one side of the restriction 50, will accelerate in the restriction 50, and will slow down after passing the restriction 50 so that the air leaving the turbine rotor 30 is again at a low velocity thereby decreasing the pressure loss of the air as leaves the turbine 30 and increasing the efficiency of the turbine 30. It is therefore noted that whether the air passes upwardly through the turbine 30 or downwardly through the turbine 30 of FIG. 2, the turbine blades 32 will rotate in the direction indicated by the arrow 52. Therefore, the present turbine blade will generate power while the air is flowing in either direction to the turbine to provide a simple but highly efficient double acting turbine-generator for converting wave action to electricity. In one embodiment of the present invention, the turbine rotor includes twelve blades 32 on a six-inch diameter hub 31 with three-inch long blades 32 extending therefrom. The concave surfaces 40 have a three-inch radius and the convex side 42 includes sides 42 directed at 45 degrees from the horizontal and joined by a rounded shoulder 47 having a half-inch radius thereby preventing sharp edges in the air flow path.

If desired, a stator 54 may be placed on one side of the turbine wheel 30 and a second stator 56 may be placed on the second side of the turbine wheel rotor 30. Each of the stators 54 and 56 includes a plurality of equally spaced parallel blades 56 and 60, respectively, which are directed towards the concave surfaces 40 of the turbine blades 32 for increasing the centrifugal effect of the air flow on the concave surfaces 40.

Figure 3:
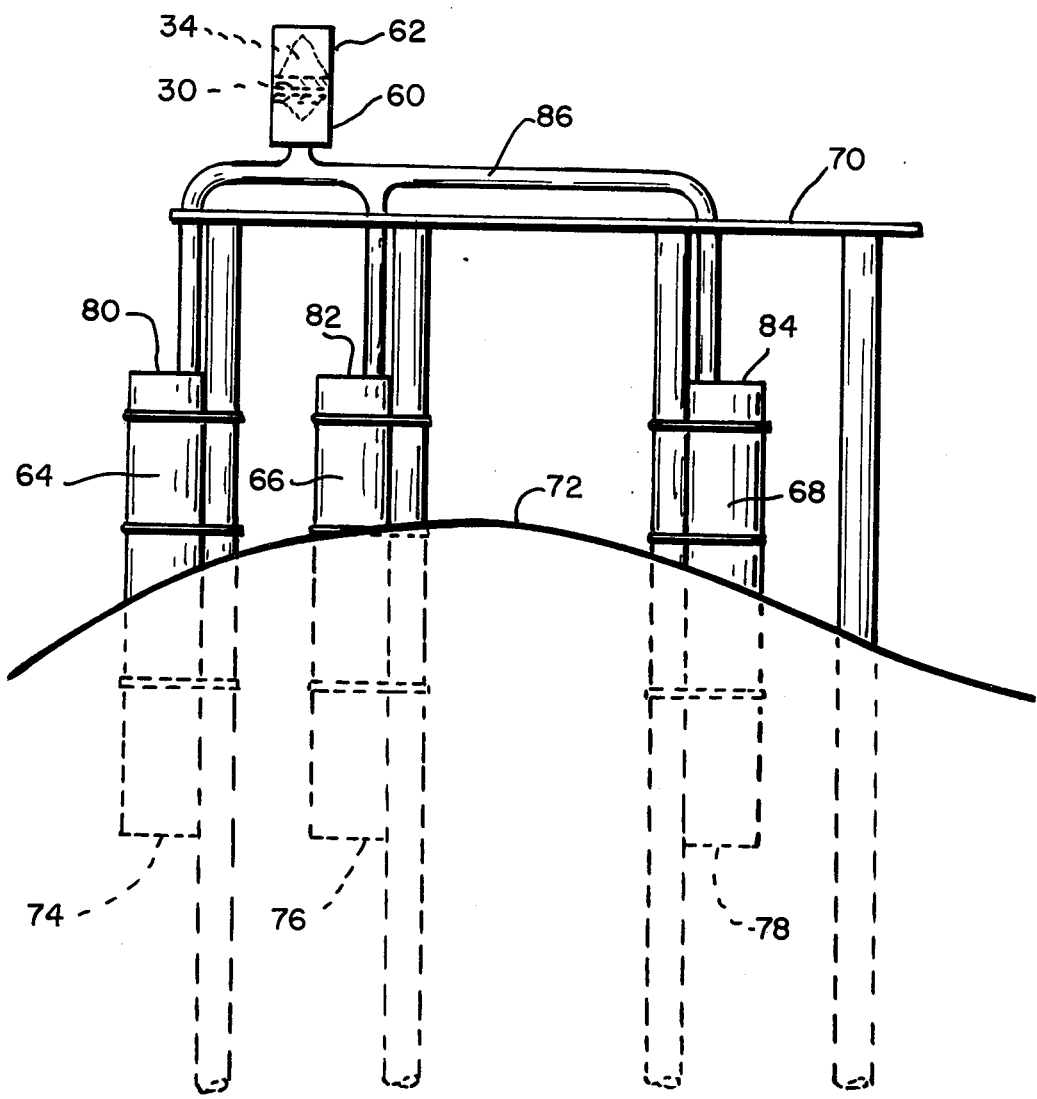
FIG. 3 is an elevational view, showing the use of the present invention in use on a fixed platform utilizing a plurality of housings.

One of the factors in providing a greater electrical output from the apparatus 10 is to increase the air flow through the tubular body. While the cross-sectional area of the enlarged portion 14 of the tubular body 12 may be suitably sized in floating buoys for increasing the air flow in the upper section 16, it may not be feasible for various reasons to utilize large cross-sectional tubular members when the apparatus is connected to a fixed platform. Referring now to FIG. 3, a modified structure is shown wherein a tubular body generally indicated by the reference numeral 60 includes a section 62 having the turbine 30 and generator 34 therein, as previously described in connection with FIG. 1. In addition, the tubular body 60 includes a plurality of housings, here shown as housings 64, 66, and 68, each of which is connected to and supported from one of the legs of a platform 70. Each of the housings 64, 66 and 68 are adapted to be connected closely together whereby each is similarly actuated by a wave 72 to have generally simultaneously rise and fall of water therein. Each of the housings 64, 66 and 68 includes a first end 74, 76 and 78, respectively, which is adapted to be inserted into the water and a second end 80, 82, and 84 which is adapted to extend out of the water. The second ends 80, 82 and 84 are manifolded together to a common conduit 86 connected to the section 62. Therefore, the plurality of housings 64, 66 and 68 increase the electrical output from the turbine 30 and generator 34 by increasing the volume of the air flow through the system.

Referring now to FIG. 4, a further embodiment is shown for increasing the air flow and consequently the electrical output of the double acting turbine 30 and generator 34. At least two housings and here shown as four housings, 90, 92, 94, and 96, are provided having their lower ends adapted to be inserted into the water waves and their upper ends adapted to extend out of the water. It is to be noted that two of the housings, such as 90 and 92, are separated horizontally a distance approximately equal to half the length of a normal wave 100. Therefore, with the wave 100 in the position shown in FIG. 4, the water inside of the housing 90 has risen to its maximum pushing air upwardly in the housing 90 while the water in the housing 92 has fallen to its minimum thereby drawing air downwardly into the housing 92. This push-pull effect may be utilized to drive the turbine 30 with a greater force to provide a greater electrical output. Since the air flow in and out of the housings 90 and 94 are in phase, the housings 90 and 94 are connected to a common manifold 102 which is connected to one side of the turbine 30. The housings 92 and 94, since they are in phase with each other, but are out of phase with housings 90 and 94, are connected to a common manifold 94 connected to the opposite side of the turbine 30 for maximum electrical output. While the housings 90, 92, 94 and 96 are shown schematically, they would preferably be connected to a platform larger than the platform 70 of FIG. 3 which was capable of taking advantage of the push-pull effect found between the valleys and crests of the normal wave action encountered.

The present invention, therefore, is well adapted to carry out the objects and attain the ends and advantages mentioned as well as others inherent therein. While presently preferred embodiments of the invention are given for the purpose of disclosure, numerous changes in the details of construction and arrangement of parts will readily suggest themselves to those skilled in the art and which are encompassed within the spirit of the invention and the scope of the appended claims.

What is claimed is:

1. An apparatus for converting the wave energy of water to electrical power comprising,
    a tubular body, one end of which is adapted to be inserted into water waves and the second end adapted to extend out of the water whereby the rise and fall of water in the body creates a flow of air in alternate directions through the body, a turbine wheel having a plurality of outwardly extending blades positioned in the body above the water level and exposed to and rotated by the flow of air, an electrical generator connected to the turbine wheel for generating electricity in response to the rotation of the wheel, the cross-sectional shape of the blades being shaped to provide an air flow passageway between adjacent blades which decreases in area from each edge thereby forming a restriction in the passageway between the blade edges whereby the wheel will rotate in a single direction regardless of the direction of flow of the air through the body.

2. The apparatus of claim 1 wherein the blades include a concave surface on one side and a convex surface on the opposite side.

3. The apparatus of claim 2 including,
a stator on each side of the turbine wheel, each stator having a plurality of blades directed towards the concave surfaces of the blades of the turbine wheel.

4. The apparatus of claim 1 wherein the tubular body includes,
a plurality of housings, one end of each of which is adapted to be inserted into the water waves and the second end of each of said housings is adapted to extend out of the water, said second ends being connected together to a common conduit whereby the plurality of housings provide an increase in air flow for increasing the electrical output, and
said turbine wheel being positioned in the common conduit.

5. The apparatus of claim 1 wherein the tubular body includes,
at least two housings, said housings horizontally spaced apart a distance approximately equal to a half the length of a normal wave, one end of each of the housings being adapted to be inserted into water waves, and the second end adapted to extend out of the water, the second end of one of the housings connected to one side of the turbine, and the second end of the other of said housings connected to the second side of the turbine.

6. The apparatus of claim 1 wherein the tubular body includes,
at least four housings, said housing positioned such that the first and third housings simultaneously encounter the crest of a normal size wave at the time the second and fourth housings encounter a valley of the wave, one end of each of said housings positioned in the water, the second end of each of the housings extending out of the water, the second end of the first and third housings connected together and connected to one side of the turbine, the second end of the second and fourth housings connected together and connected to the second side of the turbine.

7. An apparatus for converting the wave energy of water to electrical power comprising,
a tubular body, one end of which is adapted to be inserted into water waves and the second end adapted to extend out of the water whereby the rise and fall of water in the body creates a flow of air in alternate directions through the body,
a turbine wheel having a plurality of outwardly extending blades positioned in the body above the water level and exposed to and rotated by the flow of air,
an electrical generator connected to the turbine wheel for generating electricity in response to the rotation of the wheel,
said blades including a concave surface on one side and a convex surface on the second side, the cross-sectional shape of the blades increasing in size from each edge towards the center of the blades thereby providing an air flow passageway between adjacent blades which decreases in size from each blade edge whereby the turbine wheel will rotate in a single direction regardless of the direction of flow of the air through the body, and whereby the air velocity decreases after the air passes the restriction thereby decreasing the pressure loss of the air as it passes through the turbine wheel and increasing the efficiency of the turbine.

8. An apparatus for converting sea wave energy into electrical energy, comprising: a buoy which executes periodic forced vibrations with a natural frequency approximating the wave frequency along the vertical axis thereof in a manner that the buoy moves with respect to the wave surface; an air chamber in said buoy; a hydraulic piston in said buoy; a turbogenerator for converting the airflow kinetic energy into electrical energy; a turbine stage including rigidly fixed blades in said turbogenerator; a stator including rigidly fixed blades of said turbine stage; a rotor of said turbine stage, disposed downstream of said stator with respect to the direction of said airflow; a supplementary stator including rigidly fixed blades of said turbine stage, disposed downstream of said rotor with respect to the direction of said airflow and made symmetrical with said stator with respect to the plane of rotation of said rotor; a generator of said turbogenerator; a shaft of said generator; also mounted whereon is said rotor of said turbine stage; an air duct for said air chamber to communicate with said turbogenerator.

9. An apparatus for converting sea wave energy into electrical energy, comprising
a turbogenerator for converting airflow kinetic energy into electrical energy including
a turbine stage including rigidly fixed blades in said turbogenerator;
a stator including rigidly fixed blades of said turbine stage;
a rotor of said turbine stage, disposed downstream of said stator with respect to the direction of said airflow;
a supplementary stator including rigidly fixed blades of said turbine stage, disposed downstream of said rotor with respect to the direction of said airflow and made symmetrical with said stator with respect to the plane of rotation of said rotor;
a generator of said turbogenerator;
a shaft of said generator;
also mounted whereon is said rotor of said turbine stage.

10. An apparatus for converting sea wave energy into electrical energy, comprising
a buoy which moves with respect to the wave surface;
an air chamber in said buoy;
a hydraulic piston in said buoy;
a turbogenerator for converting the airflow kinetic energy into electrical energy;

a turbine stage including rigidly fixed blades in said turbogenerator;

a stator including rigidly fixed blades of said turbine stage;

a rotor of said turbine stage, disposed downstream of said stator with respect to the direction of airflow;

a supplementary stator including rigidly fixed blades of said turbine stage, disposed downstream of said rotor with respect to the direction of said airflow;

a generator of said turbogenerator;

also mounted whereon is said rotor of said turbine stage;

an air duct for said air chamber to communicate with said turbogenerator.

11. The apparatus according to claim 10, wherein:

said rotor includes blades shaped to provide an air flow passageway between adjacent blades which decreases in area from each edge thereby forming a restriction in the passageway between the blade edges producing rotation in a single direction regardless of the direction of flow of the air through the body.

12. The apparatus according to claim 11, wherein said blades include a concave surface on one side and a convex surface on the opposite side.

13. The apparatus according to claim 12, wherein said stator and said supplementary stator each have a plurality of blades directed towards the concave surfaces of the blades of said rotor.

14. An apparatus for converting sea wave energy into electrical energy, comprising:

means for converting said sea wave energy into airflow kinetic energy, a turbogenerator for converting said airflow kinetic energy into electrical energy;

a turbine stage including rigidly fixed blades in said turbogenerator;

a stator including rigidly fixed blades of said turbine stage;

a rotor of said turbine stage disposed downstream of said stator with respect to the direction of said airflow;

a supplementary stator including rigidly fixed blades of said turbine stage disposed downstream of said rotor with respect to the direction of said airflow;

a generator of said turbogenerator;

also mounted whereon is said rotor of said turbine stage.

15. Apparatus according to claim 14, further including:

an elongate hollow body having one end adapted to extend into water waves and a second end adapted to extend out of the water, the rise and fall of water in the body creating a flow of air in alternate directions through the body.

16. The apparatus of claim 15 wherein the elongate hollow body includes:

a plurality of housings, one end of each of which is adapted to be inserted into the water waves and the second end of each of said housings is adapted to extend out of the water, said second ends being connected together to a common conduit whereby the plurality of housings provide an increase in air flow for increasing the electrical output, and said turbine stage being positioned in the common conduit.

17. The apparatus of claim 15 wherein the elongate hollow body includes:

at least two housings, said housings horizontally spaced apart a distance approximately equal to half the length of a normal wave, one end of each of the housings being adapted to be inserted into water waves, and the second end adapted to extend out of the water, the second end of one of the housings connected to said stator and the second end of the other of said housings connected to said supplementary stator.

18. The apparatus of claim 15, wherein the elongate hollow body includes:

at least four housings, said housings positioned such that the first and third housings simultaneously encounter the crest of a normal size wave at the time the second and fourth housings encounter a valley of the wave, one end of each of said housings positioned in the water, the second end of each of the housings extending out of the water, the second end of the first and third housings connected together and connected to said stator, the second end of the second and fourth housings connected together and connected to said supplementary stator.

19. Apparatus according to claim 14, wherein:

said rotor includes blades shaped to provide an air flow passageway between adjacent blades which decreases in area from each edge thereby forming a restriction in the passageway between the blade edges producing rotation in a single direction regardless of the direction of flow of the air through said rotor.

20. Apparatus according to claim 19, wherein said blades include a concave surface on one side and a convex surface on the opposite side.

21. Apparatus according to claim 20, wherein said stator and said supplementary stator each have a plurality of blades directed towards the concave surfaces of the blades of said rotor.

* * * * *